US010091274B2

(12) United States Patent
Zhang

(10) Patent No.: US 10,091,274 B2
(45) Date of Patent: Oct. 2, 2018

(54) METHOD, DEVICE, AND SYSTEM FOR CONTROLLING NETWORK DEVICE AUTO-PROVISIONING

(71) Applicant: Huawei Technologies Co., Ltd., Shenzhen (CN)

(72) Inventor: Xueming Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 281 days.

(21) Appl. No.: 15/191,822

(22) Filed: Jun. 24, 2016

(65) Prior Publication Data

US 2017/0180456 A1  Jun. 22, 2017

Related U.S. Application Data

(63) Continuation of application No. PCT/CN2014/094810, filed on Dec. 24, 2014.

(30) Foreign Application Priority Data

Dec. 26, 2013  (CN) .......................... 2013 1 0732900

(51) Int. Cl.
*G06F 15/16* (2006.01)
*H04L 29/08* (2006.01)
(Continued)

(52) U.S. Cl.
CPC .......... *H04L 67/06* (2013.01); *H04L 12/4641* (2013.01); *H04L 12/66* (2013.01);
(Continued)

(58) Field of Classification Search
CPC .. H04L 12/4641; H04L 47/6205; H04L 29/06
(Continued)

(56) References Cited

U.S. PATENT DOCUMENTS 7,277,935 B2  10/2007  Sato
7,843,906 B1 *  11/2010  Chidambaram .... H04L 47/6205
370/386
(Continued)

FOREIGN PATENT DOCUMENTS

CN  101035016 A  9/2007
CN  101945110 A  1/2011
(Continued)

*Primary Examiner* — Khanh Dinh
(74) *Attorney, Agent, or Firm* — Slater Matsil, LLP

(57) ABSTRACT

A method, device, and system for controlling network device auto-provisioning is provided. The method includes: acquiring network topology information that is in a live network and of a network device, where the network topology information includes an interface and an IP address of an uplink device directly connected to the network device. The method also includes detecting whether the network topology information in the live network matches preset network topology information; and if the network topology information in the live network matches the preset network topology information, sending, by a network management device to the network device, information about enabling the File Transfer Protocol (FTP) or Trivial FTP (TFTP), and an identifier of an operating system file and/or an identifier of a configuration file, so that the network device acquires the operating system file and/or the configuration file.

18 Claims, 9 Drawing Sheets

(51) Int. Cl.
*H04L 12/24* (2006.01)
*H04L 12/46* (2006.01)
*H04L 29/12* (2006.01)
*H04L 12/66* (2006.01)

(52) U.S. Cl.
CPC ...... *H04L 41/0806* (2013.01); *H04L 41/0886* (2013.01); *H04L 41/12* (2013.01); *H04L 61/2007* (2013.01); *H04L 61/6022* (2013.01); *H04L 67/34* (2013.01); *H04L 29/08072* (2013.01)

(58) Field of Classification Search
USPC .................. 709/203, 220, 224, 228; 370/431
See application file for complete search history.

(56) References Cited

U.S. PATENT DOCUMENTS

| | | | | |
|---|---|---|---|---|
| 7,843,907 | B1* | 11/2010 | Abou-Emara | H04L 47/6205 370/386 |
| 7,990,994 | B1* | 8/2011 | Yeh | H04L 12/4641 370/431 |
| 8,218,538 | B1* | 7/2012 | Chidambaram | H04L 47/6205 370/386 |
| 8,713,295 | B2* | 4/2014 | Bax | G06F 9/4405 713/1 |
| 8,743,872 | B2* | 6/2014 | Chidambaram | H04L 47/6205 370/386 |
| 2008/0130517 | A1 | 6/2008 | Lee et al. | |
| 2013/0117766 | A1* | 5/2013 | Bax | G06F 9/4405 719/323 |
| 2013/0151646 | A1* | 6/2013 | Chidambaram | H04L 47/6205 709/213 |
| 2013/0212238 | A1 | 8/2013 | Biehler | |
| 2015/0026322 | A1 | 1/2015 | Sun et al. | |

FOREIGN PATENT DOCUMENTS

| | | |
|---|---|---|
| CN | 102075364 A | 5/2011 |
| CN | 102142988 A | 8/2011 |
| CN | 102546267 A | 7/2012 |
| CN | 102594944 A | 7/2012 |
| CN | 102624876 A | 8/2012 |
| CN | 103095495 A | 5/2013 |
| EP | 1370026 A1 | 12/2003 |
| EP | 2640002 A1 | 9/2013 |

* cited by examiner

| (Network device) device model | Name of uplink device | Network address of uplink device | Physical interface of uplink device | VLAN interface | (Network device) network address/ subnet mask | (Network device) configuration file | (Network device) version file |
|---|---|---|---|---|---|---|---|
| S2 | AGG1 | Agg_ip_1 | GE 1/0/1 | 1000 | Tor_ip_1/30 | Startup_config1.cfg | S2.bin |
| S2 | AGG1 | Agg_ip_2 | GE 2/0/1 | 1000 | Tor_ip_1/30 | Startup_config1.cfg | S2.bin |
| S2 | AGG1 | Agg_ip_3 | GE 1/0/2 | 600 | Tor_ip_1/30 | Startup_config1.cfg | S2.bin |
| S2 | AGG1 | Agg_ip_4 | GE 2/0/2 | 800 | Tor_ip_1/30 | Startup_config1.cfg | S2.bin |
| S1 | AGG2 | Agg_ip_5 | GE 1/0/1 | 1003 | Tor_ip_3/30 | Startup_config3.cfg | S1.bin |

FIG. 4

METHOD, DEVICE, AND SYSTEM FOR CONTROLLING NETWORK DEVICE AUTO-PROVISIONING

CROSS-REFERENCE TO RELATED APPLICATIONS

This application is a continuation of International Application No. PCT/CN2014/094810, filed on Dec. 24, 2014, which claims priority to Chinese Patent Application No. 201310732900.0, filed on Dec. 26, 2013, both of which are hereby incorporated by reference in their entireties.

TECHNICAL FIELD

This application belongs to the field of data communications technologies, and in particular, relates to a method, device, and system for controlling network device auto-provisioning.

BACKGROUND

A network in a data center area generally includes multiple network devices, for example, includes multiple core switches and hundreds of access switches. When a network device is added to the network, it is required to perform auto-provisioning on the network device. Auto-provisioning refers to a process of loading an operating system file and/or a configuration file and implementing configuration of a related function and a related service when the network device is powered on for the first time.

In a general solution of network device auto-provisioning, network device auto-provisioning may be implemented according to a media access control (MAC) address or a serial number (SN).

Referring to FIG. 1, FIG. 1 is an implementation flowchart of network device auto-provisioning that includes the following steps.

1. Pre-establish a correspondence between an operating system file and a MAC address that is collected in advance or pre-establish a correspondence between a configuration file and an SN that is collected in advance, store the correspondence on a Dynamic Host Configuration Protocol (DHCP) server, and store, on a File Transfer Protocol (FTP) server, the operating system file and the configuration file corresponding to the MAC address or the SN.

2. Install a network device on site, and power on and start the network device.

3. The network device acquires a temporary Internet Protocol (IP) address, a gateway address of the FTP server, an IP address of the FTP server, and a name of a minimum configuration file that are sent by the DHCP server.

5. The network device acquires the minimum configuration file from the FTP server.

6. The network device starts up by using the minimum configuration file.

7. The DHCP server determines whether data transmitted by using the Simple Network Management Protocol (SNMP) can arrive at the network device.

8. When the data transmitted by using SNMP can arrive at the network device, the server sends a request for acquiring a MAC address or an SN of the network device.

9. The network device returns the MAC address or the SN of the network device.

10. Search for a version file or a configuration file corresponding to the MAC address or the SN number.

11. The DHCP server sends, to the network device, information about enabling the File Transfer Protocol (FTP), and an identifier of the operating system file and/or an identifier of the configuration file, where the operating system file and/or the configuration file are/is required for provisioning, so that the network device establishes an FTP connection with the FTP server, and acquires the operating system file and/or the configuration file from the FTP server.

However, in the solution of network device auto-provisioning, when the network device is replaced, the MAC address or the SN of the network device is changed, re-planning is required, and plug and play of the network device cannot be implemented. Therefore, the solution is not applicable to a scenario in which the network device is replaced, and auto-provisioning cannot be implemented when the network device is replaced.

SUMMARY

An objective of this application is to provide a method and device for controlling network device auto-provisioning, so as to resolve a problem of unavailability to perform auto-provisioning when a network device is replaced with a spare part in a solution of network device auto-provisioning.

According to a first aspect, a method for controlling network device auto-provisioning by a server includes: acquiring network topology information that is in a live network and of a network device, where the network topology information includes an interface and an IP address of an uplink device directly connected to the network device. The method also includes detecting whether the network topology information in the live network matches preset network topology information. The method also includes, if the network topology information in the live network matches the preset network topology information, sending, by a network management device to the network device, information about enabling the Trivial File Transfer Protocol (TFTP) or FTP, and an identifier of an operating system file and/or an identifier of a configuration file, where the operating system file and/or the configuration file are/is required for provisioning, so that the network device establishes a TFTP connection or an FTP connection with a TFTP server or an FTP server respectively, and acquires the operating system file and/or the configuration file from the TFTP server or the FTP server. The interface includes one or a combination of a physical interface and a virtual local area network (VLAN) interface to which the physical interface belongs, and the IP address is a fixed IP address of the uplink device in the live network.

With reference to the first aspect, in a first possible implementation manner of the first aspect, the acquiring network topology information that is in a live network and of a network device includes: acquiring, by the network management device, an interface table of the uplink device and an Address Resolution Protocol (ARP) table of the network device, where the interface table of the uplink device includes a correspondence between each interface of the uplink device and a MAC address of each interface, and the ARP table of the network device includes a correspondence between an IP address of the interface at which the uplink device is directly connected to the network device and a MAC address of the interface at which the uplink device is directly connected to the network device; acquiring, according to the interface table of the uplink device and the ARP table of the network device, the MAC address of the interface of the uplink device directly connected to the network device; acquiring, from the interface table of the uplink device according to the MAC address of the interface of the uplink device directly connected to the network device, the interface of the uplink device directly connected to the network device; and acquiring, from the ARP table of the network device, the IP address of the interface at which the uplink device is directly connected to the network device.

With reference to the first aspect or the first possible implementation manner of the first aspect, in a second possible implementation manner of the first aspect, the detecting whether the network topology information in the live network matches preset network topology information includes: detecting whether the physical interface and the IP address in the network topology information in the live network match a preset physical interface and a preset IP address; or detecting whether the VLAN interface to which the physical interface belongs and the IP address that are in the network topology information in the live network match a preset VLAN interface to which a physical interface belongs and a preset IP address; or detecting whether the physical interface, the VLAN interface to which the physical interface belongs, and the IP address that are in the network topology information in the live network match a preset physical interface, a preset VLAN interface to which a physical interface belongs, and a preset IP address.

With reference to the first aspect, and either one of the first to the second possible implementation manners of the first aspect, in a third possible implementation manner of the first aspect, when the network topology information further includes a device model, the detecting whether the network topology information in the live network matches preset network topology information further includes: detecting whether the device model in the network topology information in the live network matches a device model in the preset network topology information.

According to a second aspect, a device for controlling network device auto-provisioning includes: a first acquiring unit, configured to acquire network topology information that is in a live network and of a network device, where the network topology information includes an interface and an IP address of an uplink device directly connected to the network device. The device also includes a first detecting unit, configured to detect whether the network topology information in the live network matches preset network topology information. The device also includes a sending unit, configured to: if the network topology information in the live network matches the preset network topology information, send, by a network management device to the network device, information about enabling the TFTP or FTP, and an identifier of an operating system file and/or an identifier of a configuration file, where the operating system file and/or the configuration file are/is required for provisioning, so that the network device establishes a TFTP connection or an FTP connection with a TFTP server or an FTP server respectively, and acquires the operating system file and/or the configuration file from the TFTP server or the FTP server. The interface includes one or a combination of a physical interface and a virtual local area network VLAN interface to which the physical interface belongs, and the IP address is a fixed IP address of the uplink device in the live network.

With reference to the second aspect, in a first possible implementation manner of the second aspect, the first acquiring unit is further configured to acquire an interface table of the uplink device and an ARP table of the network device, where the interface table of the uplink device includes a correspondence between each interface of the uplink device and a MAC address of each interface, and the ARP table of the network device includes a correspondence between an IP address of the interface at which the uplink device is directly connected to the network device and a MAC address of the interface at which the uplink device is directly connected to the network device. The first acquiring unit is further configured to acquire, according to the interface table of the uplink device and the ARP table of the network device, the MAC address of the interface of the uplink device directly connected to the network device. The first acquiring unit is further configured to acquire, from the interface table of the uplink device according to the MAC address of the interface of the uplink device directly connected to the network device, the interface of the uplink device directly connected to the network device. The first acquiring unit is further configured to acquire, from the ARP table of the network device, the IP address of the interface at which the uplink device is directly connected to the network device.

With reference to the second aspect, in a second possible implementation manner of the second aspect, the detecting unit is further configured to detect whether the physical interface and the IP address in the network topology information in the live network match a preset physical interface and a preset IP address; or is further configured to detect whether the VLAN interface to which the physical interface belongs and the IP address that are in the network topology information in the live network match a preset VLAN interface to which a physical interface belongs and a preset IP address; or is further configured to detect whether the physical interface, the VLAN interface to which the physical interface belongs, and the IP address that are in the network topology information in the live network match a preset physical interface, a preset VLAN interface to which a physical interface belongs, and a preset IP address.

With reference to the second aspect or with reference to the first to the second possible implementation manners of the second aspect, in a third possible implementation manner of the first aspect, when the network topology information further includes a device model, the detecting unit is further configured to detect whether the device model in the network topology information matches a device model in the preset network topology information.

According to a third aspect, a device for controlling network device auto-provisioning is provided, where the device includes a processor, a memory, and a communications interface, where the processor, the communications interface, and the memory communicate with each other by using a bus. The communications interface is configured to communicate with another communications device. The processor is configured to execute a program. The memory is configured to store the program, where the program is used for acquiring network topology information that is in a live network and of a network device, where the network topology information includes an interface and an IP address of an uplink device directly connected to the network device, and the interface includes one or a combination of a physical interface and a VLAN interface to which the physical interface belongs; is used for detecting whether the network topology information in the live network matches preset network topology information; and is used for: if the network topology information in the live network matches the preset network topology information, sending, by a network management device to the network device, information about enabling the TFTP or FTP, and an identifier of an operating system file and/or an identifier of a configuration file, where the operating system file and/or the configuration file are/is required for provisioning, so that the network device establishes a TFTP connection or an FTP connection with a TFTP server or an FTP server respectively, and acquires the operating system file and/or the configuration file from the TFTP server or the FTP server.

According to a fourth aspect, a system for controlling network device auto-provisioning includes a device for controlling network device auto-provisioning, at least one network device, and at least one uplink device, where the uplink device is connected to the network device in a manner of a direct connection.

In this application, it is detected whether network topology information in a live network matches preset network topology information, which helps resolve a problem of unavailability to implement auto-provisioning when a network device is replaced with a spare part in a solution of device auto-provisioning. Therefore, plug and play is implemented for a network device in a same location during auto-provisioning.

BRIEF DESCRIPTION OF THE DRAWINGS

FIG. 4 is a table including preset network topology information according to an embodiment;

DETAILED DESCRIPTION OF ILLUSTRATIVE EMBODIMENTS

To make the objectives, technical solutions, and advantages of this application clearer and more comprehensible, the following further describes this application in detail with reference to the accompanying drawings and embodiments.

Embodiment 1

Figure 1:
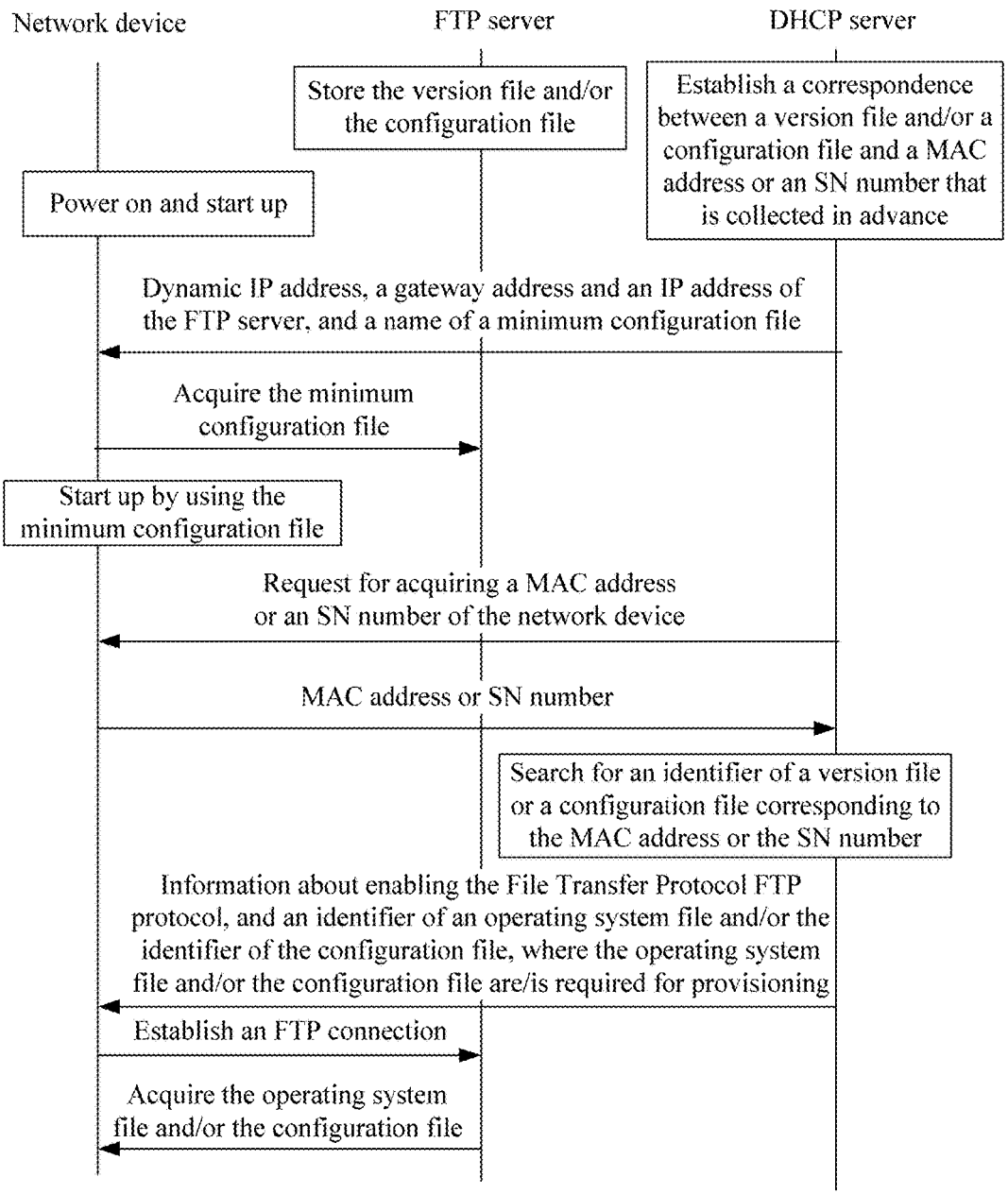
FIG. 1 is an implementation flowchart of network device auto-provisioning.
Figure 2:
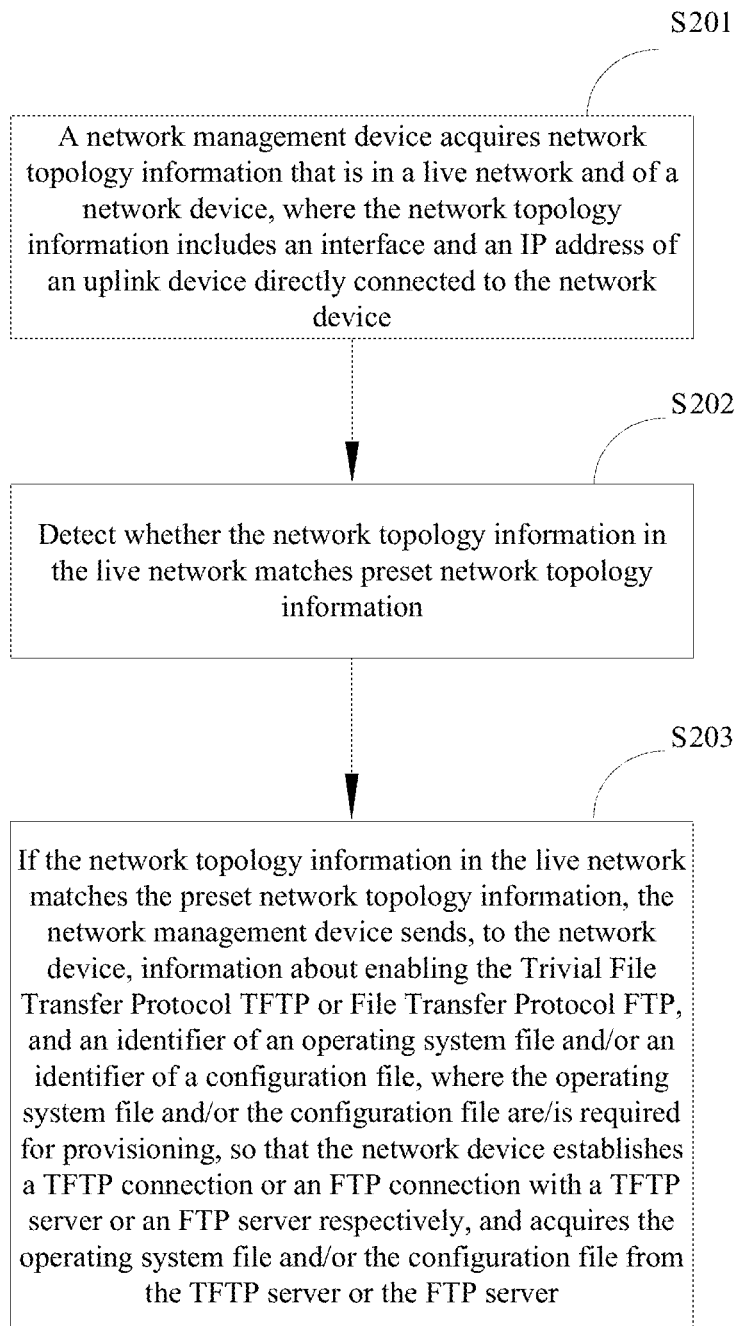
FIG. 2 is an implementation flowchart of a method for controlling network device auto-provisioning according to an embodiment.

Referring to FIG. 2, FIG. 2 is an implementation flowchart of a method for controlling network device auto-provisioning according to an embodiment, and details are described as follows.

Step S201: A network management device acquires network topology information that is in a live network and of a network device, where the network topology information includes an interface and an IP address of an uplink device directly connected to the network device.

The live network represents an actual network.

In this embodiment, the network device includes a network switch, a router, and an optical network terminal (ONT).

In this embodiment, the uplink device includes a network switch, a router, and an optical line terminal (OLT).

The network device refers to a device that has not completed provisioning. The uplink device refers to a device that has completed provisioning configuration.

"Directly connected" refers to a connection manner in which the network device is directly connected to the uplink device without passing through another network device.

An implementation process of acquiring the network topology information that is in the live network and of the network device is described in Embodiment 2.

Step S202: The network management device detects whether the network topology information in the live network matches preset network topology information.

The network topology information includes the interface and the IP address of the uplink device directly connected to the network device.

In step S201 and step S202, the interface includes one or a combination of a physical interface and a VLAN interface of the uplink device directly connected to the network device, and the IP address is a fixed IP address of the uplink device in the live network.

The physical interface of the uplink device directly connected to the network device refers to a physical interface that is located inside the uplink device and that is directly connected to the network device.

The VLAN interface of the uplink device directly connected to the network device refers to a VLAN interface to which the physical interface that is located inside the uplink device and that is directly connected to the network device belongs. As a logical interface that is set based on a VLAN and that has an IP property, the VLAN interface can implement link layer forwarding inside the VLAN. In addition, because the VLAN interface has the IP property, the VLAN interface can also participate in network layer forwarding.

It should be noted that, there may be one or more physical interfaces directly connected to the network device.

Figure 3:
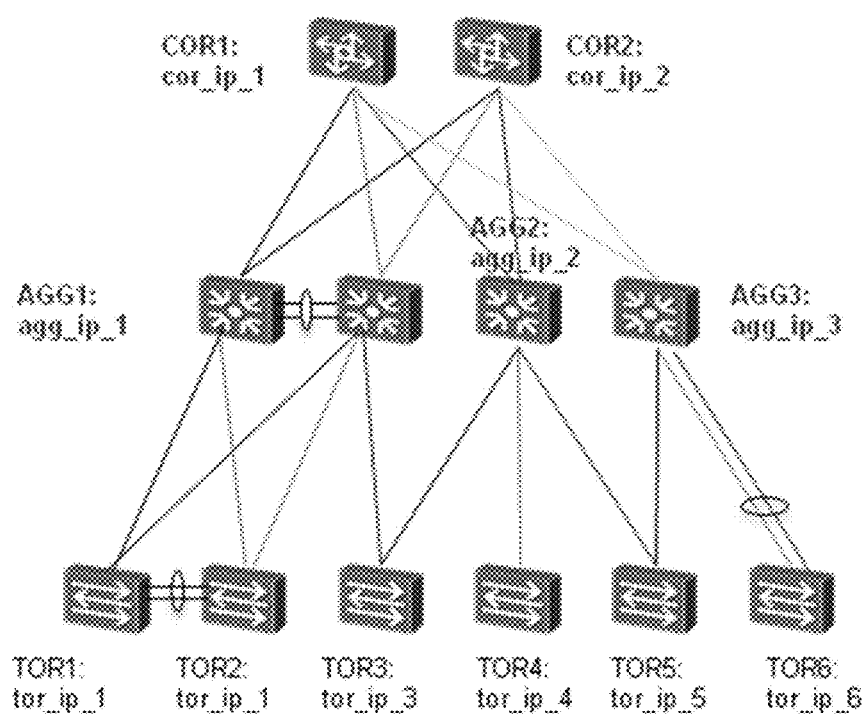
FIG. 3 shows a diagram of a preferable connection relationship between a network device and an uplink device according to an embodiment.

Referring to FIG. 3, FIG. 3 shows a diagram of a preferable connection relationship between a network device and an uplink device according to an embodiment.

The IP address is a fixed IP address of the uplink device in the live network. The fixed IP address is an IP address in a configuration file.

For example, when provisioning is performed, the network device receives a dynamic IP address allocated by the network management device in the live network, and configures an address of the network device to be the dynamic IP address. In a process of the provisioning, after acquiring a configuration file, the network device extracts an IP address from the configuration file, and replaces the temporary IP address that is previously configured with the extracted IP address. After replacement, the IP address of the network device is the IP address in the configuration file, that is, the fixed IP address in the live network. A network device that has completed provisioning configuration may serve as an uplink device to participate in a configuration process of a device that has not completed provisioning.

An implementation process of detecting the network topology information in the live network and the preset network topology information is described in Embodiment 3, and description is not provided herein.

Step S203: If the network topology information in the live network matches the preset network topology information, the network management device sends, to the network device, information about enabling the TFTP or FTP protocol, and an identifier of an operating system file and/or an identifier of a configuration file, where the operating system file and/or the configuration file are/is required for provisioning, so that the network device establishes a TFTP connection or an IP connection with a TFTP server or an FTP server respectively, and acquires the operating system file and/or the configuration file.

Acquiring, by a device, an operating system file and/or a configuration file by using the FTP protocol is substantially establishing, by the device, an FTP connection with an FTP server first, and then acquiring the operating system file and/or the configuration file by using a command get in the FTP protocol according to identifiers/an identifier of the operating system file and/or the configuration file.

The operating system file is a binary file, and the file is loaded when the network device starts up, so as to drive and schedule all hardware resources of a network, implement forwarding of a data packet and a protocol packet, and implement communication between network devices.

The configuration file is a file that defines a device configuration parameter, such as an IP address, a VLAN, a default route, and a login parameter. After starting up according to the operating system file, the network device configures a related parameter according to the configuration file.

The operating system file and/or the configuration file may be stored on the TFTP or FTP server.

A correspondence between the operating system file and/or the configuration file and the preset network topology information is pre-established in the network management device, and the identifiers/identifier of the operating system file and/or the configuration file stored on the FTP server may be invoked according to the correspondence between the operating system file and/or the configuration file and the preset network topology information, and the identifiers/identifier of the operating system file and/or the configuration file is sent to the network device.

The operating system file and/or the configuration file may also be stored on the network management device.

When no operating system file is stored on the network device, and when the operating system file is sent to the network device, the network device may load the operating system file and establish an operating system after receiving the operating system file.

When no configuration file is stored on the network device, and when the configuration file is sent to the network device, the network device may implement configuration of a related parameter according to a configuration instruction in the configuration file after receiving the configuration file.

When neither an operating system file nor a configuration file is stored on the network device, and when the operating system file and the configuration file are sent to the network device, after receiving the operating system file and the configuration file, the network device may load a version, establish an operating system, implement configuration of a related parameter by using the configuration file, and access a network.

In this embodiment, if the network topology information in the live network matches the preset network topology information, it indicates that the network topology information that is in the live network and of the network device is consistent with the preset network topology information, that is, an uplink device of the network device in the live network and an interface of the uplink device are the same as an uplink device and an interface of the uplink device in the preset network topology information. The operating system file and/or the configuration file are/is sent to the network device, which reduces auto-provisioning configuration costs, reduces auto-provisioning configuration time, and improves auto-provisioning configuration efficiency. In addition, auto-provisioning can be implemented when the network device is replaced with a spare part.

Embodiment 2

As an embodiment, the acquiring network topology information that is in a live network and of a network device includes: acquiring, by a network management device, an interface table of an uplink device and an ARP table of the network device, where the interface table of the uplink device includes a correspondence between each interface of the uplink device and a MAC address of each interface, and the ARP table of the network device includes a correspondence between an IP address of an interface at which the uplink device is directly connected to the network device and a MAC address of the interface at which the uplink device is directly connected to the network device; acquiring, according to the interface table of the uplink device and the ARP table of the network device, the MAC address of the interface of the uplink device directly connected to the network device; acquiring, from the interface table of the uplink device according to the MAC address of the interface of the uplink device directly connected to the network device, the interface of the uplink device directly connected to the network device; and acquiring, from the ARP table of the network device, the IP address of the interface at which the uplink device is directly connected to the network device.

The network management device sends an interface table acquiring request to each uplink device in the live network, so that the uplink devices return their respective interface tables after receiving the interface table acquiring request.

The network management device sends an ARP table acquiring request to each uplink device and a network device in the live network, so that the uplink devices and the network device return their respective ARP tables after receiving the ARP table acquiring request.

For ease of description, the interface table acquiring request is as follows:

Snmp get ifDescr, ifPhysAddress, ifOperaStatus //acquire an interface table, where
a used protocol is SNMP, a command is get, if Descr represents a description of an interface,
if Phys Address represents a MAC address of a physical interface, and
if OperaStatus represents a physical interface state, the physical interface state is active only when a physical interface is connected to and interworks with another device, and only an interface in the active interface state is acquired herein.

For ease of description, the ARP table acquiring request is as follows:

Snmp get ipAdEntAddr, ipAdEntIfIndex //acquire an ARP table, where
a used protocol is SNMP, a command is get, and the following ipAdEntIfIndex is a device interface index.

The network management device receives the interface table returned by the uplink device, where the interface table includes an IP address of the uplink device, a MAC address of a physical interface of the uplink device, and a VLAN interface of the uplink device.

The network management device receives the ARP table (hereinafter referred to as a first ARP table) returned by the network device, where the first ARP table includes a MAC address (hereinafter referred to as a first MAC address) of an interface at which the uplink device is directly connected to the network device.

The network management device receives the interface table returned by the uplink device, and acquires a MAC address (hereinafter referred to as a second MAC address) in the returned interface table.

The network management device detects whether there is a common MAC address in the first MAC address in the first ARP table and the second MAC address in the interface table.

If there is a common MAC address (hereinafter referred to as a third MAC address), it indicates that the network device that stores the first ARP table is directly connected to the uplink device that stores the interface table in which the second MAC address is located, where the third MAC address is the MAC address of the interface of the uplink device directly connected to the network device.

The network management device searches, according to the third MAC address, the interface table returned by the uplink device for a physical interface corresponding to the third MAC address, where the physical interface is a physical interface of the uplink device directly connected to the network device.

The network management device searches, according to the third MAC address, the interface table returned by the uplink device for a VLAN interface corresponding to the third MAC address of the network device, where the VLAN interface is a VLAN interface to which the physical interface of the uplink device directly connected to the network device belongs.

The network management device acquires, from the ARP table returned by the network device, by using the third MAC address and according to a correspondence between an IP address of the interface at which the uplink device is directly connected to the network device and the MAC address of the interface at which the uplink device is directly connected to the network device, the IP address of the interface at which the uplink device is directly connected to the network device.

When one network device is used to replace another network device, the network management device sends an interface table acquiring request to each uplink device in the live network, so that the uplink devices return their respective interface tables after receiving the interface table acquiring request.

The network management device sends an ARP table acquiring request to the network device in the live network after replacement, so that the network device returns an ARP table thereof after receiving the ARP table acquiring request.

The network management device receives the ARP table (hereinafter referred to as a second ARP table) returned by the network device after replacement, where the second ARP table includes a MAC address (hereinafter referred to as a fourth MAC address) of an interface at which the uplink device is directly connected to the network device after replacement.

The network management device receives the interface table returned by the uplink device, and acquires a MAC address (hereinafter referred to as a second MAC address) in the returned interface table.

The network management device detects whether there is a common MAC address in the fourth MAC address in the second ARP table and the second MAC address in the interface table.

If there is a common MAC address (hereinafter referred to as a third MAC address), it indicates that the network device that stores the second ARP table is directly connected to the uplink device that stores the interface table in which the second MAC address is located, where the third MAC address is a MAC address of the interface of the uplink device directly connected to the network device.

When the network device is replaced, because the ARP table returned by the network device after replacement is unchanged, and the interface table returned by the uplink device is unchanged, the common MAC address of the first ARP table and the interface table is unchanged. That is, the third MAC address is unchanged. Therefore, the physical interface and the VLAN interface that are corresponding to the third MAC address and the IP address of the physical interface are unchanged, and network topology information that is in the live network and of the network device after replacement is also unchanged. In the embodiments, a matching result for detecting whether the network topology information that is in the live network and of the network device matches the preset network topology information is also unchanged. Therefore, information about enabling the TFTP or FTP and an identifier of an operating system file and/or an identifier of a configuration file may be sent to the network device subsequently, where the operating system file and/or the configuration file are/is required for provisioning. Even if a MAC address or an SN of the network device is changed, re-planning is not required, and plug and play of the network device can be implemented. Therefore, the embodiments are applicable to a scenario in which the network device is replaced, and auto-provisioning can be implemented when the network device is replaced.

It should be noted that, all the first MAC address, the second MAC address, the third MAC address, and the fourth MAC address refer to a MAC address of a physical interface.

Embodiment 3

As an embodiment, the detecting whether the network topology information in the live network matches the preset network topology information includes: detecting whether a physical interface and an IP address in the network topology information in the live network match a preset physical interface and a preset IP address; or detecting whether a VLAN interface to which a physical interface belongs and an IP address that are in the network topology information in the live network match a preset VLAN interface to which a physical interface belongs and a preset IP address; or detecting whether a physical interface, a VLAN interface to which a physical interface belongs, and an IP address that are in the network topology information in the live network match a preset physical interface, a preset VLAN interface to which a physical interface belongs, and a preset IP address.

In this embodiment, there are three solutions for detecting whether the network topology information in the live network and the preset network topology information.

In a first solution, it is detected whether the physical interface and the IP address in the network topology information in the live network match the preset physical interface and the preset IP address.

When it is detected that the IP address in the network topology information in the live network matches the preset IP address, it indicates that an uplink device connecting the live network is a preset uplink device.

When the physical interface in the network topology information in the live network matches the preset physical interface, it indicates that the physical interface in the network topology information in the live network and the preset physical interface are a same physical interface.

When one network device is used to replace another network device, the network device can acquire an operating system file and/or a configuration file only by accessing the same physical interface of the same uplink device directly connected to the another network device that is previously replaced by the network device.

In a second solution, it is detected whether the VLAN interface to which the physical interface belongs and the IP address that are in the network topology information in the live network match the preset VLAN interface to which a physical interface belongs and the preset IP address.

When the VLAN interface in the network topology information in the live network matches the preset VLAN interface, it indicates that an accessed port is correct, and a VLAN interface for accessing a preset uplink device may be limited. When a spare part is used for replacement, a current network device can acquire an operating system file and/or a configuration file by accessing multiple physical interfaces of the same VLAN interface of the same uplink device directly connected to the previous network device.

In a third solution, it is detected whether the physical interface, the VLAN interface to which the physical interface belongs, and the IP address that are in the network topology information in the live network match the preset physical interface, the preset VLAN interface to which a physical interface belongs, and the preset IP address.

When the physical interface and the VLAN interface to which the physical interface belongs that are in the network topology information in the live network match the preset physical interface and the VLAN interface to which the preset physical interface belongs, it indicates that a physical interface that is accessed by the network device is correct.

When a spare part is used for replacement, a current network device can acquire an operating system file and/or a configuration file by accessing the same physical interface of the same VLAN interface of the same uplink device directly connected to the previous network device.

In this embodiment, the second solution is preferable because when multiple physical interfaces correspond to one VLAN interface in an actual application, one physical interface may be selected from the multiple physical interfaces to access a network, so that the solution has flexibility and is suitable for access of the network device.

Embodiment 4

As an embodiment, optionally, when the network topology information further includes a device model, the detecting whether the network topology information in the live network matches the preset network topology information further includes: detecting whether the device model in the network topology information in the live network matches a device model in the preset network topology information.

In this embodiment, a device model of a network device that needs auto-provisioning is stored in the preset network topology information.

A network management device sends a device model acquiring request to a network device in the live network, so that the network device returns a device model of the network device after receiving the device model acquiring request.

For ease of description, the device model acquiring request is as follows:
Snmp get sysObjectID, where
a used protocol is SNMP, a command is get, and sysObjectID is a system object identifier defined by a manufacturer.

In this embodiment, there are three solutions for detecting whether the device model in the network topology information in the live network matches a device model in the preset network topology information.

In a first solution, when it is detected whether a physical interface and an IP address in the network topology information in the live network match a preset physical interface and a preset IP address, it is further detected whether the device model in the network topology information in the live network matches the device model in the preset network topology information. That is, there are three matching items, which are the physical interface, the IP address, and the device model respectively. It is required that matching results of all the three matching items be matching.

In a second solution, when it is detected whether a VLAN interface to which a physical interface belongs and an IP address that are in the network topology information in the live network match a preset VLAN interface to which a physical interface belongs and a preset IP address, it is further detected whether the device model in the network topology information in the live network matches the device model in the preset network topology information. That is, there are three matching items, which are the VLAN interface, the IP address, and the device model respectively. It is required that matching results of all the three matching items be matching.

In a third solution, when it is detected whether a physical interface, a VLAN interface to which the physical interface belongs, and an IP address that are in the network topology information in the live network match a preset physical interface, a preset VLAN interface to which a physical interface belongs, and a preset IP address, it is further detected whether the device model in the network topology information in the live network matches the device model in the preset network topology information. That is, there are four matching items, which are the VLAN interface, the IP address, the device model, and the physical interface respectively. It is required that matching results of all the four matching items be matching.

In this embodiment, if the network topology information in the live network matches the preset network topology information, it indicates that the network topology information that is in the live network and of the network device is consistent with the preset network topology information. That is, a location of the network device in the network and the device model are unchanged. An operating system file and/or a configuration file are/is sent to the network device, so that the network device can implement auto-provisioning configuration. Therefore, plug and play is implemented when a network device of a same device model in a same location performs auto-provisioning, which reduces auto-provisioning configuration costs, and reduces auto-provisioning configuration time. In addition, auto-provisioning can be implemented when a network device is replaced with a spare part, which improves auto-provisioning configuration efficiency.

Referring to FIG. 4, FIG. 4 is a table including preset network topology information according to an embodiment.

In two rows of bold data in the table, a device model of a network device is S2, and the network device is connected to physical interfaces of two uplink devices, where a physical interface of a first uplink device is GE1/0/1, an IP address is Agg_ip_1, and a VLAN interface is moo, and a physical interface of a second uplink device is GE2/0/3, an IP address is Agg_ip_2, and a VLAN interface is moo.

Using three matching items in the preset network topology information as an example, when the three matching items are a VLAN interface, an IP address, and a device model respectively, it is required that matching results of all the three matching items be matching.

When the following is acquired: a device model of a network device that is to perform auto-provisioning is S2, VLAN interfaces of uplink devices are moo, and IP addresses of the uplink devices are Agg_ip_1 and Agg_ip_2, it indicates that they match.

In this case, an operating system file S2.bin and a configuration file Startup_config1.cfg are sent to the network device.

In this embodiment, a situation of performing auto-provisioning for network devices of different models in a same location is prevented, and a situation of performing auto-provisioning for network devices of a same model in different locations is prevented, so that plug and play is implemented when a network device of a same model in a same location performs auto-provisioning, which reduces auto-provisioning configuration costs, reduces auto-provisioning configuration time, and improves auto-provisioning configuration efficiency. In addition, auto-provisioning can be implemented when a device is replaced with a spare part.

Embodiment 5

Figure 5:
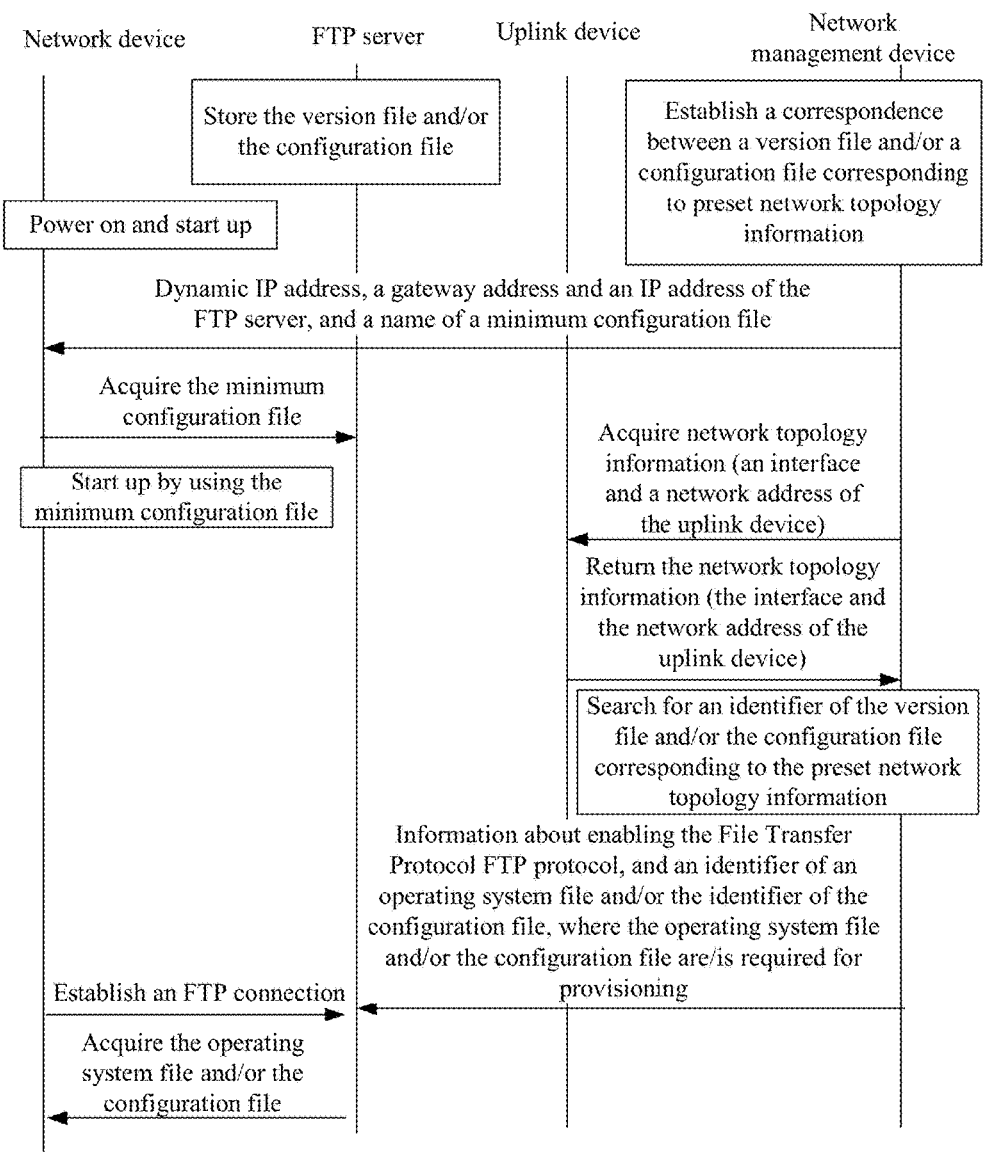
FIG. 5 is a preferable implementation flowchart of sending an operating system file and/or a configuration file when network topology information includes an interface and an IP address of an uplink device directly connected to a network device according to an embodiment.

Referring to FIG. 5, FIG. 5 is a preferable implementation flowchart of sending an operating system file and/or a configuration file when network topology information includes an interface and an IP address of an uplink device directly connected to a network device according to an embodiment of the present invention, and details are described as follows.

1. Based on the network topology information, a network management device pre-establishes a correspondence between an operating system file and/or a configuration file and preset network topology information, and stores the corresponding operating system file and/or configuration file on a FTP server, where the network topology information includes the interface and the IP address of the uplink device directly connected to the network device.

2. Manually install the network device on site, and power on and start the network device.

3. The network management device sends a dynamic IP address, a gateway address and an IP address of the FTP server, and a name of a minimum configuration file.

4. The network device receives the dynamic IP address, the gateway address and the IP address of the FTP server, and the name of the minimum configuration file that are sent by the network management device.

5. The network device acquires the minimum configuration file from the FTP server.

6. The network device starts up by using the minimum configuration file.

7. The network management device determines whether data transmitted by using the SNMP can arrive at the network device.

8. When the data transmitted by using SNMP can arrive at the network device, the network management device acquires the network topology information that is in a live network and of the network device, where the network topology information includes the interface and the IP address of the uplink device directly connected to the network device, and detects whether the network topology information in the live network matches the preset network topology information.

9. If the network topology information in the live network matches the preset network topology information, the network management device sends, to the network device, information about enabling the FTP, and an identifier of the operating system file and/or an identifier of the configuration file, where the operating system file and/or the configuration file are/is required for provisioning, so that the network device establishes an FTP connection with the FTP server, and acquires the operating system file and/or the configuration file from the FTP server.

Embodiment 6

Figure 6:
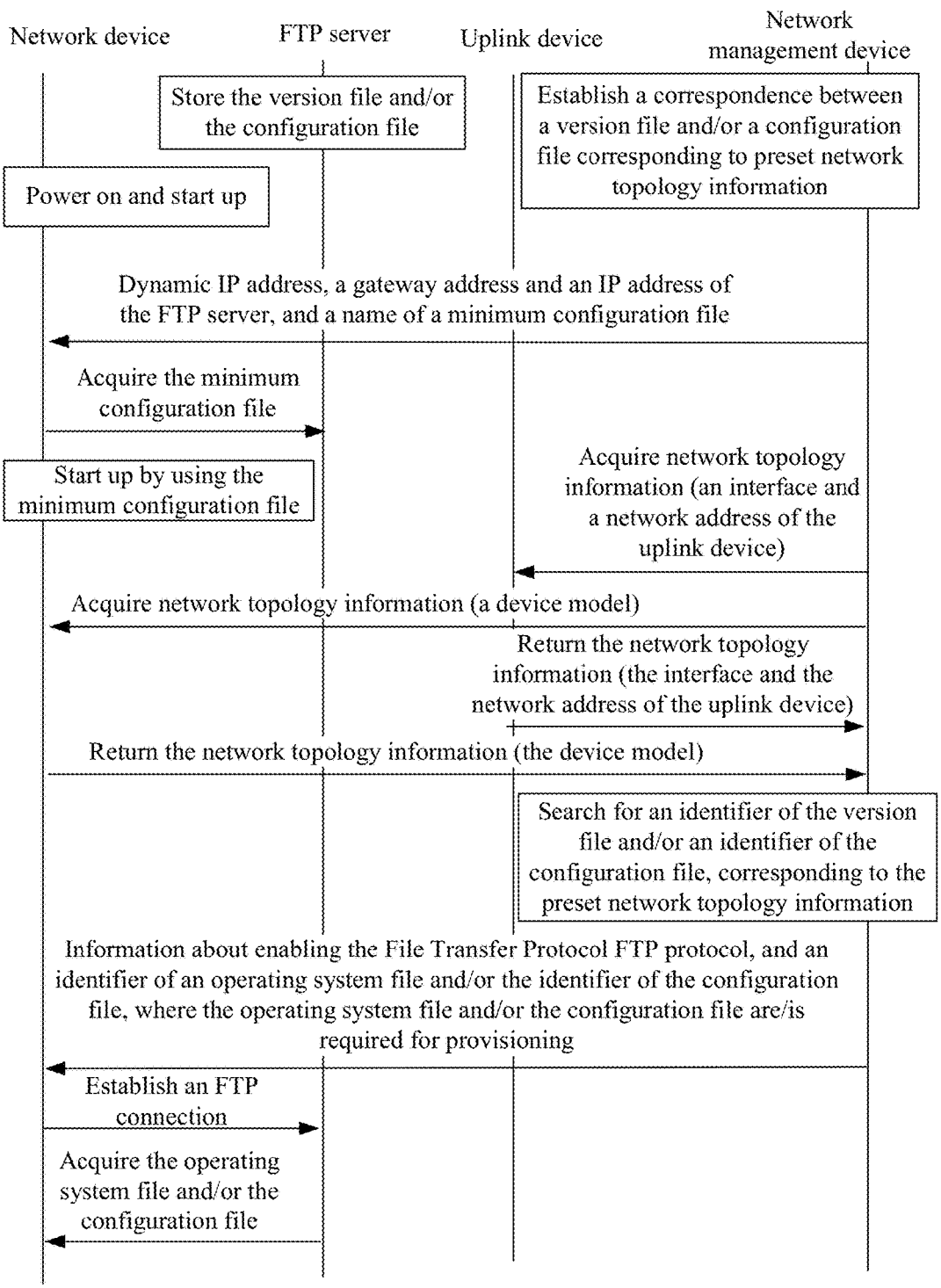
FIG. 6 is a preferable implementation flowchart of sending an operating system file and/or a configuration file when network topology information includes an interface and an IP address of an uplink device directly connected to a network device and a device model of the network device according to an embodiment.

Referring to FIG. 6, FIG. 6 is a preferable implementation flowchart of sending an operating system file and/or a configuration file when network topology information includes an interface and an IP address of an uplink device directly connected to a network device and a device model of the network device according to an embodiment, and details are described as follows.

1. Based on the network topology information, pre-establish a correspondence between an operating system file and/or a configuration file and preset network topology information, store the correspondence on a network management device, and store, on a FTP server, the operating system file and/or the configuration file corresponding to the preset network topology information, where the network topology information includes the interface and the IP address of the uplink device directly connected to the network device and the device model of the network device.

2. Install the network device on site, and power on and start the network device.

3. The network management device sends a dynamic IP address, a gateway address and an IP address of the FTP server, and a name of a minimum configuration file.

4. The network device receives the dynamic IP address, the gateway address and the IP address of the FTP server, and the name of the minimum configuration file that are sent by a dynamic host configuration network management device.

5. The network device acquires the minimum configuration file from the FTP server.

6. The network device starts up by using the minimum configuration file.

7. The network management device determines whether data transmitted by using the SNMP can arrive at the network device.

8. When the data transmitted by using SNMP can arrive at the network device, the network management device acquires the network topology information that is in a live network and of the network device, where the network topology information includes the interface and the IP address of the uplink device directly connected to the network device and the device model, and detects whether the network topology information in the live network matches the preset network topology information.

9. If the network topology information in the live network matches the preset network topology information, the network management device sends, to the network device, information about enabling the FTP, and an identifier of the operating system file and/or an identifier of the configuration file, where the operating system file and/or the configuration file are/is required for provisioning, so that the network device establishes an FTP connection with the FTP server, and acquires the operating system file and/or the configuration file from the FTP server.

Embodiment 7

Figure 7:
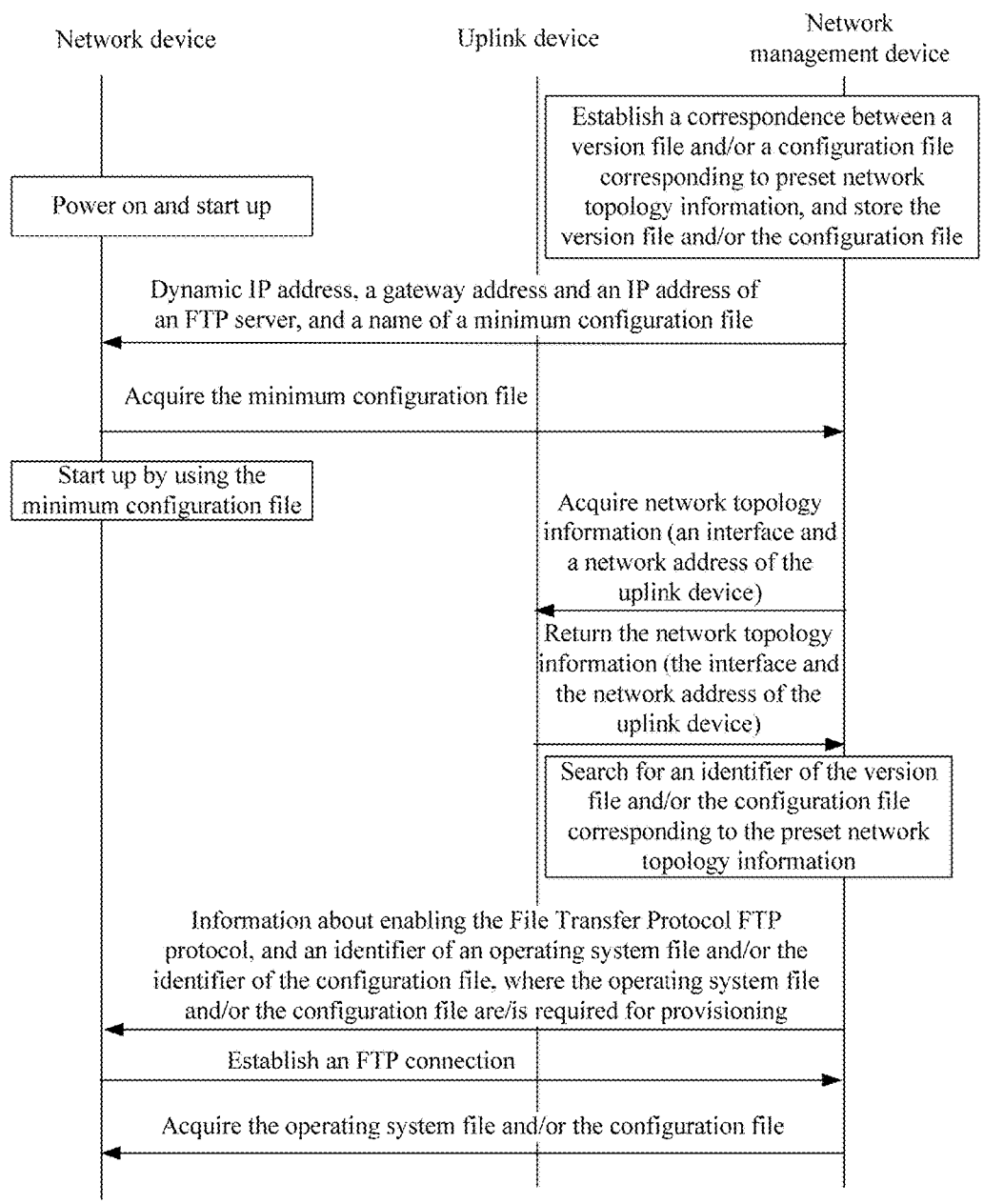
FIG. 7 is another preferable implementation flowchart of sending an operating system file and/or a configuration file when network topology information includes an interface and an IP address of an uplink device directly connected to a network device according to an embodiment.

Referring to FIG. 7, FIG. 7 is another preferable implementation flowchart of sending an operating system file and/or a configuration file when network topology information includes an interface and an IP address of an uplink device directly connected to a network device according to an embodiment.

The operating system file and/or the configuration file are/is stored on a network management device.

Embodiment 8

Figure 8:
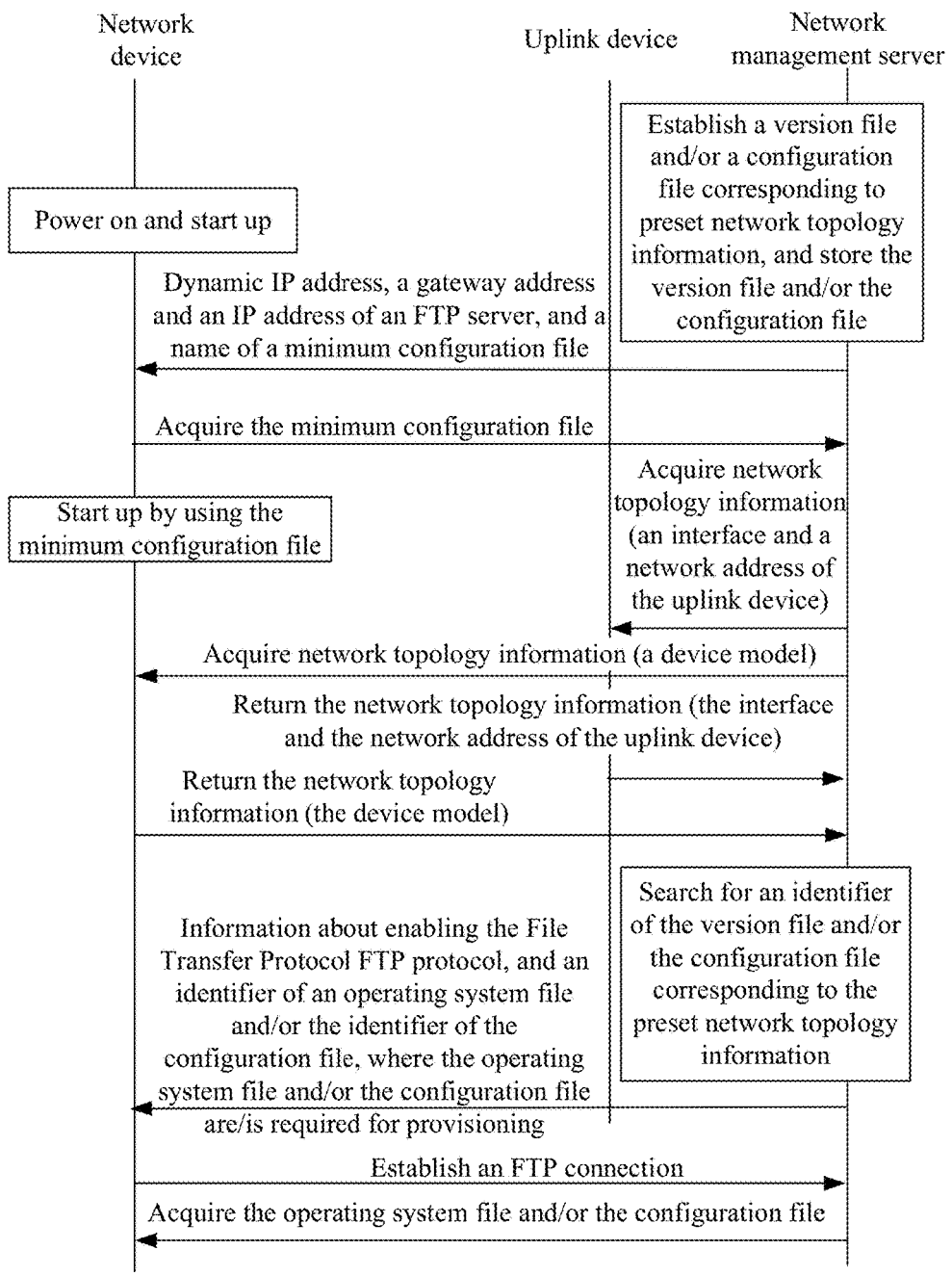
FIG. 8 is another preferable implementation flowchart of sending an operating system file and/or a configuration file when network topology information includes an interface and an IP address of an uplink device directly connected to a network device and a device model of the network device according to an embodiment.

Referring to FIG. 8, FIG. 8 is another preferable implementation flowchart of sending an operating system file and/or a configuration file when network topology information includes an interface and an IP address of an uplink device directly connected to a network device and a device model of the network device according to an embodiment.

The operating system file and/or the configuration file are/is stored on a network management device.

Embodiment 9

Figure 9:
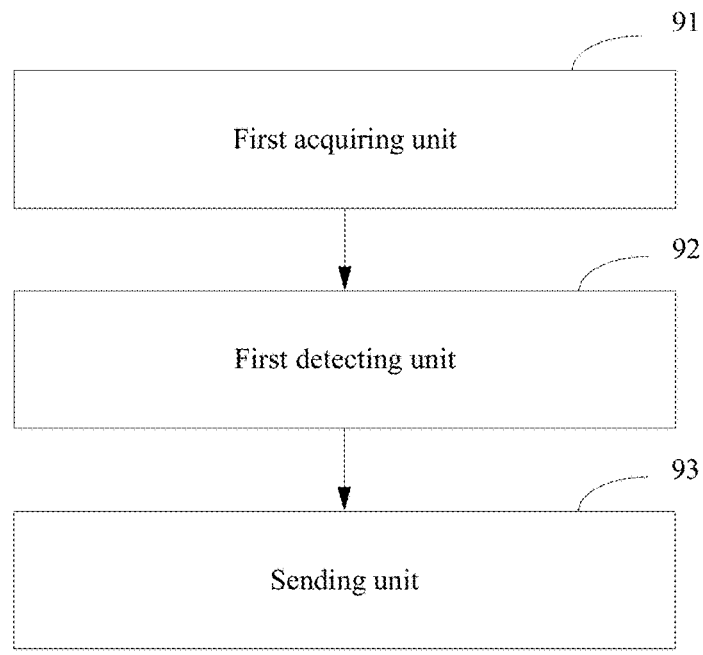
FIG. 9 is a device for controlling network device auto-provisioning according to an embodiment.

Referring to FIG. 9, FIG. 9 is a device for controlling network device auto-provisioning according to an embodiment. For ease of description, only parts related to this embodiment are shown, and details are described as follows.

A first acquiring unit 91 is configured to acquire network topology information that is in a live network and of a network device, where the network topology information includes an interface and an IP address of an uplink device directly connected to the network device.

A first detecting unit 92 is configured to detect whether the network topology information in the live network matches preset network topology information.

A sending unit 93 is configured to: if the network topology information in the live network matches the preset network topology information, send, by a network management device to the network device, information about enabling the TFTP or FTP, and an identifier of an operating system file and/or an identifier of a configuration file, where the operating system file and/or the configuration file are/is required for provisioning, so that the network device establishes a TFTP/FTP connection with a TFTP/FTP server, and acquires the operating system file and/or the configuration file from the TFTP server or the FTP server.

The interface includes one or a combination of a physical interface and a VLAN interface to which the physical interface belongs, and the IP address is a fixed IP address of the uplink device in the live network.

The sending unit may be located in a device for storing the operating system file and/or the configuration file, and the device includes but is not limited to a DHCP server and an FTP server.

Further, in the device, the first acquiring unit is further configured to acquire an interface table of the uplink device and an ARP table of the network device, where the interface table of the uplink device includes a correspondence between each interface of the uplink device and a MAC address of each interface, and the ARP table of the network device includes a correspondence between an IP address of the interface at which the uplink device is directly connected to the network device and a MAC address of the interface at which the uplink device is directly connected to the network device; is further configured to acquire, according to the interface table of the uplink device and the ARP table of the network device, the MAC address of the interface of the uplink device directly connected to the network device; is further configured to acquire, from the interface table of the uplink device according to the MAC address of the interface of the uplink device directly connected to the network device, the interface of the uplink device directly connected to the network device; and is further configured to acquire, from the ARP table of the network device, the IP address of the interface at which the uplink device is directly connected to the network device.

Further, in the device, the detecting unit is further configured to detect whether the physical interface and the IP address in the network topology information in the live network match a preset physical interface and a preset IP address; or is further configured to detect whether the VLAN interface to which the physical interface belongs and the IP address that are in the network topology information in the live network match a preset VLAN interface to which a physical interface belongs and a preset IP address; or is further configured to detect whether the physical interface, the VLAN interface to which the physical interface belongs, and the IP address that are in the network topology information in the live network match a preset physical interface, a preset VLAN interface to which a physical interface belongs, and a preset IP address.

Further, in the device, when the network topology information further includes a device model, the detecting unit is further configured to detect whether the device model in the network topology information matches a device model in the preset network topology information.

Figure 10:
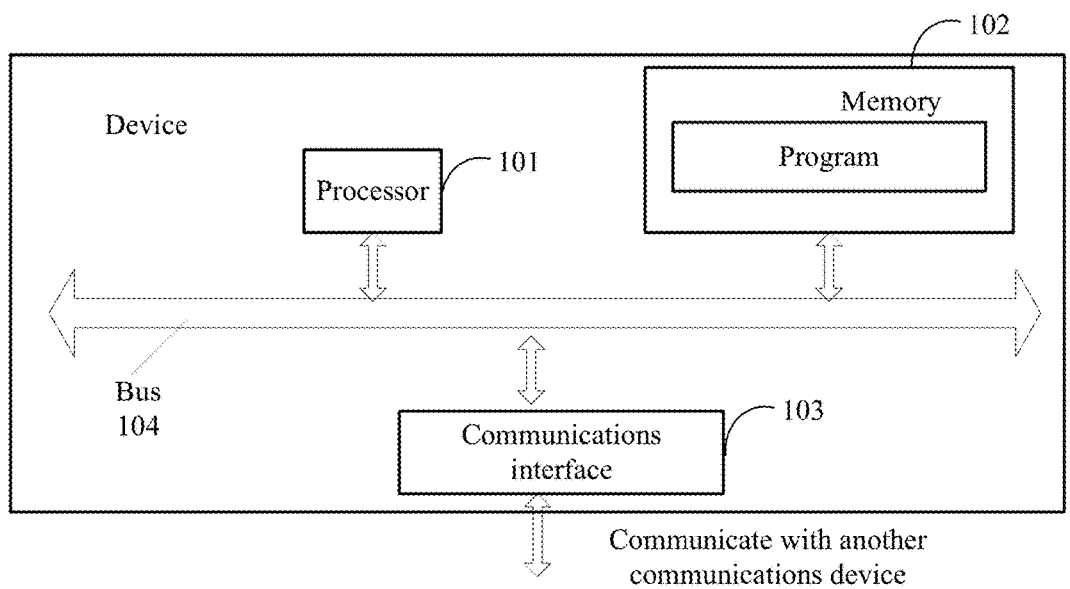
FIG. 10 is a schematic diagram of a structure of a device for controlling network device auto-provisioning according to an embodiment.

Referring to FIG. 10, FIG. 10 is a schematic diagram of a structure of a device for controlling network device auto-provisioning according to an embodiment of the present invention. The device includes a processor 101, a communications interface 102, a memory 103, and a bus 104.

The processor 101, the communications interface 102, and the memory 103 communicate with each other by using the bus 104.

The communications interface 102 is configured to communicate with another communications device.

The processor 101 is configured to execute a program.

Specifically, the program may include program code, where the program code includes a computer operation instruction.

The processor 101 may be a central processing unit (CPU).

The memory 103 is configured to store the program, where the program is used for acquiring network topology information that is in a live network and of a network device, where the network topology information includes an interface and an IP address of an uplink device directly connected to the network device; is used for detecting whether the network topology information in the live network matches preset network topology information; and is used for: if the network topology information in the live network matches the preset network topology information, sending, by a network management device to the network device, information about enabling the TFTP or FTP, and an identifier of an operating system file and/or an identifier of a configuration file, where the operating system file and/or the configuration file are/is required for provisioning, so that the network device establishes a TFTP connection or an FTP connection with a TFTP server or an FTP server respectively, and acquires the operating system file and/or the configuration file from the TFTP server or the FTP server; where the interface includes one or a combination of a physical interface and a VLAN interface to which the physical interface belongs, and the IP address is a fixed IP address of the uplink device in the live network.

A system for controlling network device auto-provisioning includes a device for controlling network device auto-provisioning, at least one network device, and at least one uplink device, where the uplink device is connected to the network device in a manner of a direct connection.

Based on the foregoing descriptions of the implementation manners, a person skilled in the art may clearly understand that the present invention may be implemented by software in addition to necessary general hardware. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   acquiring, by a network management device, network topology information of a network device in a live network, wherein the network topology information comprises an interface and an Internet Protocol (IP) address of an uplink device directly connected to the network device;
   detecting whether the network topology information in the live network matches preset network topology information; and
   sending, by the network management device to the network device, information about enabling Trivial File Transfer Protocol (TFTP) or File Transfer Protocol (FTP), and an identifier of a file, in response to the network topology information in the live network matching the preset network topology information, wherein the file is required for provisioning, so that the network device establishes a TFTP connection or an FTP connection with a TFTP server or an FTP server respectively, and acquires the file from the TFTP server or the FTP server;
   wherein the interface comprises one or a combination of a physical interface and a virtual local area network (VLAN) interface to which the physical interface belongs; and
   wherein the file is an operating system file, an identifier of a configuration file, or both.

2. The method according to claim 1, wherein acquiring the network topology information comprises:
   acquiring, by the network management device, an interface table of the uplink device and an Address Resolution Protocol (ARP) table of the network device, wherein the interface table of the uplink device comprises a correspondence between each interface of the uplink device and a media access control (MAC) address of each interface, and the ARP table of the network device comprises a correspondence between an IP address of the interface at which the uplink device is directly connected to the network device and a MAC address of the interface at which the uplink device is directly connected to the network device;
   acquiring, according to the interface table of the uplink device and the ARP table of the network device, the MAC address of the interface of the uplink device directly connected to the network device;
   acquiring, from the interface table of the uplink device according to the MAC address of the interface of the uplink device directly connected to the network device, the interface of the uplink device directly connected to the network device; and
   acquiring, from the ARP table of the network device, the IP address of the interface at which the uplink device is directly connected to the network device.

3. The method according to claim 1, wherein detecting whether the network topology information in the live network matches preset network topology information comprises:
   detecting whether a physical interface and IP address in the network topology information in the live network match a preset physical interface and a preset IP address.

4. The method according to claim 1, wherein detecting whether the network topology information in the live network matches preset network topology information comprises:
   detecting whether a VLAN interface to which a physical interface belongs and an IP address that are in the network topology information in the live network match a preset VLAN interface to which a physical interface belongs and a preset IP address.

5. The method according to claim 1, wherein detecting whether the network topology information in the live network matches preset network topology information comprises:
   detecting whether a physical interface, a VLAN interface to which the physical interface belongs, and an IP address that are in the network topology information in the live network match a preset physical interface, a preset VLAN interface to which the preset physical interface belongs, and a preset IP address.

6. The method according to claim 1, wherein the network topology information further comprises a device model, and detecting whether the network topology information in the live network matches preset network topology information further comprises:

detecting whether a device model in the network topology information in the live network matches a device model in the preset network topology information.

7. A device, comprising a processor and a communications interface, wherein the processor and the communications interface are coupled with each other;
wherein the processor is configured to:
acquire network topology information of a network device that is in a live network, wherein the network topology information comprises an interface and an Internet Protocol (IP) address of an uplink device directly connected to the network device, and the interface of the uplink device comprises one or more of a physical interface and a virtual local area network (VLAN) interface to which the physical interface belongs;
detect whether the network topology information in the live network matches preset network topology information; and
send to the network device, using the communications interface, information about enabling Trivial File Transfer Protocol (TFTP) or File Transfer Protocol (FTP), and an identifier of a file, in response to the network topology information in the live network matching the preset network topology information, wherein the file is required for provisioning, so that the network device establishes a TFTP connection or an FTP connection with a TFTP server or an FTP server respectively, and acquires the file from the TFTP server or the FTP server;
wherein the file is an operating system file, an identifier of a configuration file, or both.

8. The device according to claim 7, wherein the processor is further configured to:
acquire an interface table of the uplink device and an Address Resolution Protocol (ARP) table of the network device, wherein the interface table of the uplink device comprises a correspondence between each interface of the uplink device and a media access control (MAC) address of each interface, and the ARP table of the network device comprises a correspondence between an IP address of the interface at which the uplink device is directly connected to the network device and a MAC address of the interface at which the uplink device is directly connected to the network device;
acquire, according to the interface table of the uplink device and the ARP table of the network device, the MAC address of the interface of the uplink device directly connected to the network device;
acquire, from the interface table of the uplink device according to the MAC address of the interface of the uplink device directly connected to the network device, the interface of the uplink device directly connected to the network device; and
acquire, from the ARP table of the network device, the IP address of the interface at which the uplink device is directly connected to the network device.

9. The device according to claim 7, wherein the processor is further configured to:
detect whether the physical interface and the IP address in the network topology information in the live network match a preset physical interface and a preset IP address.

10. The device according to claim 7, wherein the processor is further configured to:
detect whether the VLAN interface to which the physical interface belongs and the IP address that are in the network topology information in the live network match a preset VLAN interface to which a physical interface belongs and a preset IP address.

11. The device according to claim 7, wherein the processor is further configured to:
detect whether the physical interface, the VLAN interface to which the physical interface belongs, and the IP address that are in the network topology information in the live network match a preset physical interface, a preset VLAN interface to which a physical interface belongs, and a preset IP address.

12. The device according to claim 7, wherein the network topology information further comprises a device model, and wherein the processor is configured to:
detect whether the device model in the network topology information in the live network matches a device model in the preset network topology information.

13. A device for controlling network device auto-provisioning, comprising:
a first acquiring unit, configured to acquire network topology information of a network device that is in a live network, wherein the network topology information comprises an interface and an IP address of an uplink device directly connected to the network device;
a first detecting unit, configured to detect whether the network topology information in the live network matches preset network topology information; and
a sending unit, configured to:
in response to the network topology information in the live network matching the preset network topology information, send, by a network management device to the network device, information about enabling the Trivial File Transfer Protocol (TFTP) or File Transfer Protocol (FTP), and an identifier of a file, wherein the file is required for provisioning, so that the network device establishes a TFTP connection or an FTP connection with a TFTP server or an FTP server respectively, and acquires the file from the TFTP server or the FTP server;
wherein the interface comprises one or a combination of a physical interface and a virtual local area network (VLAN) interface to which the physical interface belongs, and the IP address is a fixed IP address of the uplink device in the live network; and
wherein the file is an operating system file, an identifier of a configuration file, or both.

14. The device according to claim 13, wherein the first acquiring unit is further configured to:
acquire an interface table of the uplink device and an Address Resolution Protocol (ARP) table of the network device, wherein the interface table of the uplink device comprises a correspondence between each interface of the uplink device and a media access control MAC address of each interface, and the ARP table of the network device comprises a correspondence between an IP address of the interface at which the uplink device is directly connected to the network device and a MAC address of the interface at which the uplink device is directly connected to the network device;
acquire, according to the interface table of the uplink device and the ARP table of the network device, the MAC address of the interface of the uplink device directly connected to the network device;

acquire, from the interface table of the uplink device according to the MAC address of the interface of the uplink device directly connected to the network device, the interface of the uplink device directly connected to the network device; and acquire, from the ARP table of the network device, the IP address of the interface at which the uplink device is directly connected to the network device.

15. The device according to claim 13, wherein the detecting unit is further configured to detect whether the physical interface and the IP address in the network topology information in the live network match a preset physical interface and a preset IP address.

16. The device according to claim 13, wherein the detecting unit is further configured to detect whether the VLAN interface to which the physical interface belongs and the IP address that are in the network topology information in the live network match a preset VLAN interface to which a physical interface belongs and a preset IP address.

17. The device according to claim 13, wherein the detecting unit is further configured to detect whether the physical interface, the VLAN interface to which the physical interface belongs, and the IP address that are in the network topology information in the live network match a preset physical interface, a preset VLAN interface to which a physical interface belongs, and a preset uplink device IP address.

18. The device according to any one of claim 13, wherein the network topology information further comprises a device model, and the detecting unit is further configured to detect whether the device model in the network topology information matches a device model in the preset network topology information.

* * * * *